Patented Nov. 29, 1927.

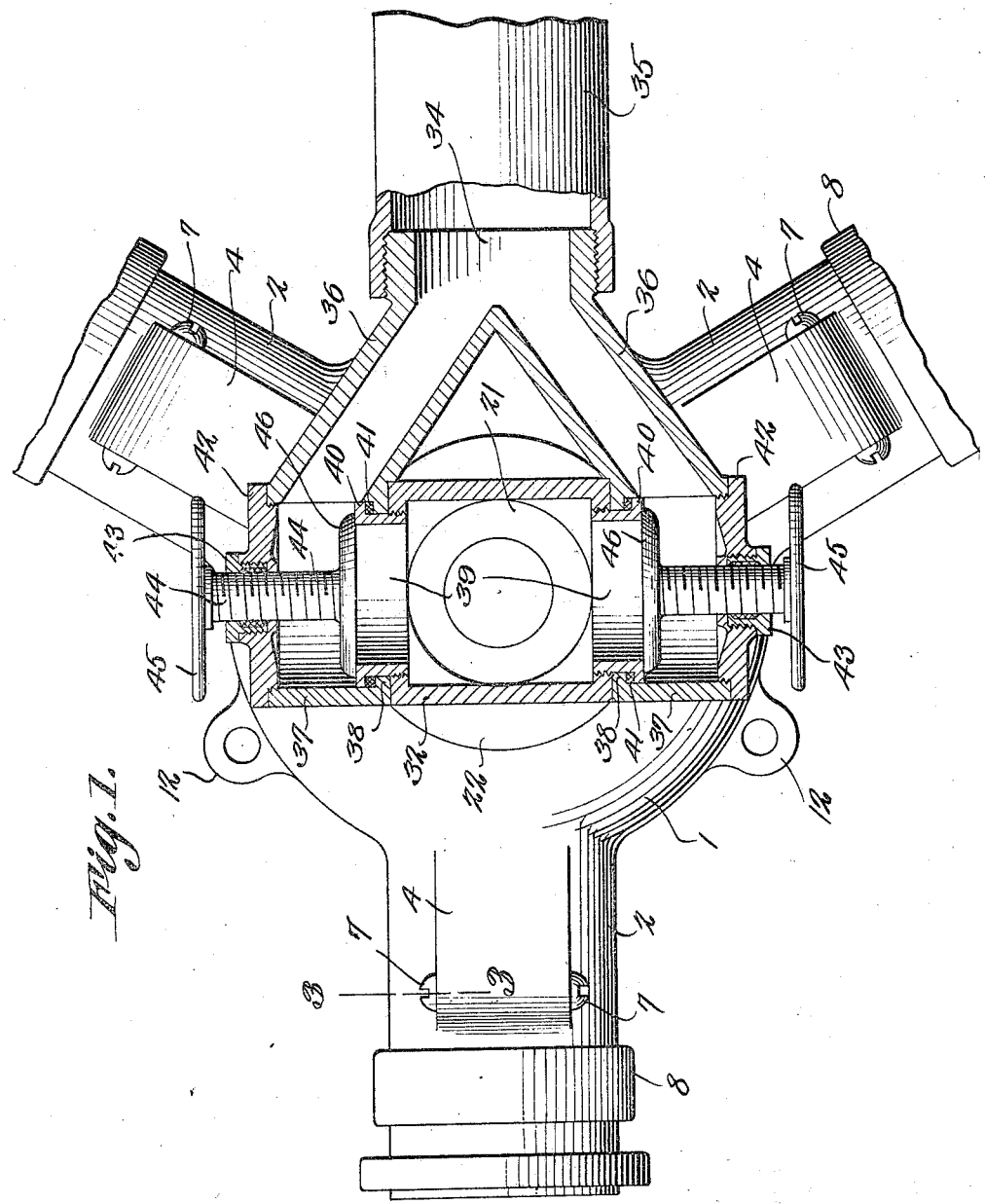

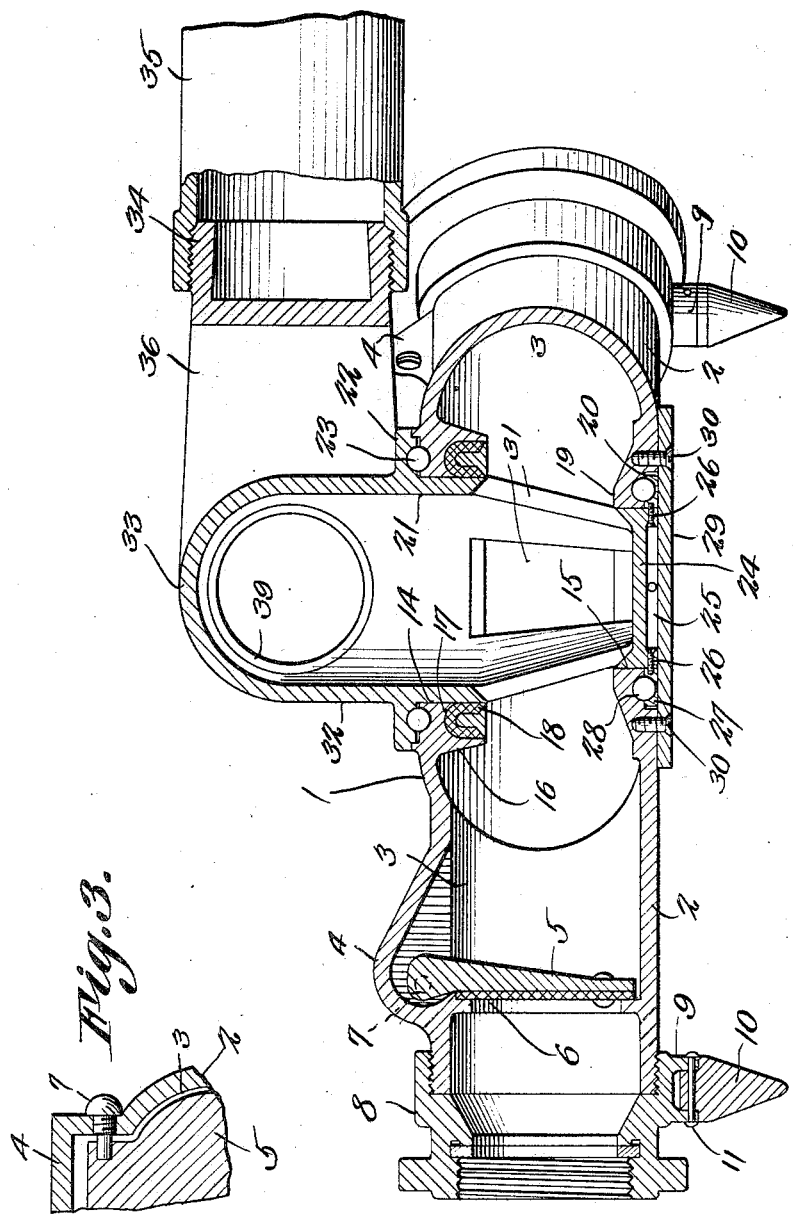

1,650,829

UNITED STATES PATENT OFFICE.

JORDAN W. GRANT, OF PORTSMOUTH, VIRGINIA.

NOZZLE STAND.

Application filed February 23, 1926. Serial No. 90,171.

This invention aims to provide novel means for mounting a hydraulic nozzle for movement throughout a wide range and to provide novel means for regulating the amount of liquid which flows through the nozzle.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 is a plan, wherein parts appear in horizontal section;

Figure 2 is a vertical section;

Figure 3 is a fragmental section taken about on the line 3—3 of Figure 1.

In carrying out the invention, there is provided a central hollow body 1, having outwardly extended radial arms 2, the passages 3 of the arms 2 communicating with the body 1. The arms 2 have off-sets 4, into which extend the upper ends of outwardly closing valves 5, adapted to cooperate with seats 6 formed in the arms 2, the upper ends of the valves 5 being carried by pivot elements 7 which are mounted in the sides of the off-sets 4, the valves 5, thus, being hingedly or pivotally mounted. Couplings 8 are mounted detachably, for instance by threading, on the outer ends of the arms 2. The couplings 8 are provided with depending sockets 9 in which feet 10 are held by securing elements 11. When it is desired to mount the article on a trivet, the feet 10 may be used; or, if preferred, fastening devices (not shown) may be extended downwardly through ears 12 which project outwardly from the periphery of the portable body 1.

There is a central opening 14 in the top of the body 1, and in the bottom of the body 1 there is a central opening 15, the opening 15 being somewhat smaller in diameter than the opening 14. The body 1 is supplied with a depending annular flange 16, located about the opening 14, and supplied with an annular seat 17 in which is located an annular packing 18, the packing being constructed as desired. The bottom of the body 1 has a thickened rib 19 located about the opening 15. In the lower surface of the rib 19 there is an annular recess 20.

The numeral 21 marks a tubular rotatable member or coupling journaled to turn about a vertical axis within the opening 14, within the packing 18 and within the opening 15. The member 21 has an outstanding flange 22, and anti-friction devices, such as balls 23, are disposed between the flange 22 and the top of the body 1. The lower end of the tubular rotatable member 21 tapers, as shown in Figure 2, and the member 21 is supplied at its lower end with a bottom plate 24 which is equipped with a depending annular rim 25. Securing elements 26 extend outwardly through the rim 25, and hold a ball race 27 on the lower end of the tubular rotatable member 21, the ball race 27 being received in the annular recess 20 of the body 1, and anti-friction balls 28 being interposed between the ball race 27 and the rib 19, as shown in Figure 2. A closure 29, in the form of a plate, is attached by securing members 30 to the bottom of the body 1, the closure extending across the ball race 27, and across the entire lower end of the tubular rotatable member 21. The member 21 is equipped with lateral ports 31 which communicate with the interior of the body 1. The rotatable member 21 includes an upstanding extension 32 which may be rectangular in outline, as indicated in Figure 1. The extension 32 is closed at the top, as indicated at 33.

The numeral 34 marks what may be denominated a pipe connection, since it is assembled in any suitable way with a tube 35 adapted to carry a discharge nozzle (not shown). The connection 34 has diverging branches 36 that are joined to casings 37 located on opposite sides of the extension 32 of the rotary tubular member 21. At their inner ends, the casings 37 have flanges 38. Tubular connections 39 are threaded into the sides of the extension 32 of the rotary member 21. The connections 39 have lateral flanges 40 located outwardly of the flanges 38 on the casings 37. The casings 37 are mounted to swing on the connections 39, and packing rings 41 are located between the flanges 40 and 38. Closures 42 are threaded or mounted otherwise in the outer ends of the casings 37 and carry glands 43 into which are threaded operating members in the form of screws 44, the screws 44 being provided at their outer ends with hand wheels 45, and being equipped at their inner ends with valves 46 which seat against the connections 39.

Water enters the body 1 by way of the arms 2 and the valves 5 act as checks, in the event that water is not supplied by one or two of the arms 2. The water flows from the interior of the body 1 into the rotary tubular member 21, by way of the ports 31, and, passing upwardly into the part 32 of the member 21, moves laterally through the connections 39, into the chambers or casings 37, and from the casings 37, the water finds its way into the tube or nozzle 35, by way of the branches 36 of the pipe connection 34.

The supply to the nozzle may be regulated by closing one or both of the valves 46. The nozzle and the connection 34 have a compound movement. First, the part 34 can swing about an axis represented by the axis of the connections 39, and, secondly, the rotary member 21 may be turned about its own axis. The nozzle, therefore, has practically a universal movement.

It is not necessary or desirable to specify the particular purpose for which the article is intended, since this specification is addressed to a person skilled in the art, but it may be stated that the device is well adapted to withstand the strong reaction produced by a nozzle through which a stream of water is passing under heavy pressure. Furthermore, the article is so made that the nozzle may be turned and swung practically in any direction.

What is claimed is:—

1. In a device of the class described, a hollow body having an inlet, a tubular member journaled in the body, a discharge connection provided with branches located on opposite sides of the tubular member, a combined means for establishing communication between the branches of the connection and the tubular member and for mounting the connection for swinging movement upon the tubular member, and valves under the governance of an operator and controlling the branches.

2. In a device of the class described, a hollow body having an inlet, a tubular member journaled in the body, a discharge connection provided with branches, casings assembled with the branches and located on opposite sides of the tubular member, tubular couplings establishing communication between the casings and the tubular member, and joining the casings with the tubular member for swinging movement, valves adapted to seat on the couplings, and means mounted in the outer ends of the casings for operating the valves.

3. In a nozzle stand, a portable hollow body of sufficient horizontal extent to afford a substantial footing and support, the body having an inlet, a transverse coupling disposed above the body, the longitudinal axis of the coupling being substantially horizontal, means for connecting the coupling at a point intermediate its ends with the body for rotation about a vertical axis which passes through the geometrical center of the body, a nozzle connection having diverging branches, and means for joining the branches of the nozzle connection to the coupling on opposite sides of the vertical axis of the body for rotation with respect to the longitudinal axis of the coupling, the longitudinal axis of the coupling and the vertical axis of the body being located in the same vertical plane, and the nozzle connection being movable in a plane which coincides with the vertical axis of the body.

4. In a nozzle stand, a portable hollow body of sufficient horizontal extent to afford a substantial footing and support, the body having an inlet, a transverse coupling disposed above the body, the longitudinal axis of the coupling being substantially horizontal, the coupling being provided intermediate its ends with a tubular part journaled on the body for rotation about a vertical axis which passes through the geometrical center of the body, means engaging the bottom of the body and a part of the coupling for holding the coupling assembled with the body, a nozzle connection having diverging branches, and means for joining the branches of the nozzle connection to the coupling on opposite sides of the vertical axis of the body for rotation with respect to the longitudinal axis of the coupling, the longitudinal axis of the coupling and the vertical axis of the body being located in the same vertical plane, and the nozzle connection being movable in a plane which coincides with the vertical axis of the body.

5. In a nozzle stand a portable hollow body of sufficient lateral extent to afford a substantial footing and support, the body having an inlet, a transverse coupling disposed externally of the body, the longitudinal axis of the coupling being substantially parallel to the body, means for connecting the coupling at a point intermediate its ends with the body for rotation about an axis at right angles to the longitudinal axis of the coupling and passing through the geometrical center of the body, a nozzle connection having diverging branches, and means for joining the branches of the nozzle connection to the coupling on opposite sides of the last-specified axis for rotation with respect to the longitudinal axis of the coupling, the longitudinal axis of the coupling and said axis of the body being located in the same plane at right angles to the body, and the nozzle connection being movable in a plane which coincides with said axis of the body.

In testimony that I claim the foregoing as my own, I have hereto affixed my signature.

JORDAN W. GRANT.